(12) United States Patent
Li

(10) Patent No.: US 8,072,196 B1
(45) Date of Patent: Dec. 6, 2011

(54) SYSTEM AND METHOD FOR PROVIDING A DYNAMICALLY CONFIGURED LOW DROP OUT REGULATOR WITH ZERO QUIESCENT CURRENT AND FAST TRANSIENT RESPONSE

(75) Inventor: Yushan Li, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 650 days.

(21) Appl. No.: 12/008,852

(22) Filed: Jan. 15, 2008

(51) Int. Cl.
  *G05F 1/563* (2006.01)
  *G05F 1/595* (2006.01)
(52) U.S. Cl. ......... 323/266; 323/268; 323/273; 323/282
(58) Field of Classification Search .................. 323/268, 323/271, 277, 275, 266, 273, 282, 284
  See application file for complete search history.

(56) References Cited

U.S. PATENT DOCUMENTS

| | | | | |
|---|---|---|---|---|
| 4,881,023 A * | 11/1989 | Perusse et al. | ............... | 323/266 |
| 5,216,351 A * | 6/1993 | Shimoda | ...................... | 323/224 |
| 5,258,701 A * | 11/1993 | Pizzi et al. | ..................... | 323/269 |
| 5,525,895 A * | 6/1996 | Fishman | ......................... | 323/268 |
| 5,592,072 A | 1/1997 | Brown | ........................... | 323/268 |
| 5,861,735 A * | 1/1999 | Uchida | ........................... | 323/271 |
| 6,229,289 B1 | 5/2001 | Piovaccari et al. | ............ | 323/268 |
| 6,441,591 B2 | 8/2002 | Nokkonen | | |
| 6,452,368 B1 | 9/2002 | Basso et al. | | |
| 6,815,935 B2 * | 11/2004 | Fujii | ............................. | 323/272 |
| 6,900,621 B1 * | 5/2005 | Gunther | ........................ | 323/266 |
| 6,973,337 B2 | 12/2005 | Jiguet et al. | | |
| 7,064,531 B1 | 6/2006 | Zinn | | |
| 7,084,612 B2 * | 8/2006 | Zinn | .............................. | 323/266 |
| 7,148,670 B2 | 12/2006 | Inn et al. | | |
| 7,679,433 B1 * | 3/2010 | Li | ..................................... | 330/10 |
| 2004/0027099 A1 * | 2/2004 | Fujii | .............................. | 323/234 |
| 2007/0200539 A1 * | 8/2007 | Ganti et al. | .................... | 323/282 |
| 2007/0290657 A1 * | 12/2007 | Cretella et al. | ................ | 323/222 |
| 2009/0039845 A1 * | 2/2009 | Gerber et al. | ................. | 323/273 |
| 2009/0273327 A1 * | 11/2009 | Ito et al. | ...................... | 323/284 |

FOREIGN PATENT DOCUMENTS
WO    WO 2007066583 A1 *  6/2007

OTHER PUBLICATIONS

Pallab Midya, "Linear Switcher Combination with Novel Feedback", 2000 IEEE, pp. 1425-1429.
Erich Bayer et al., "Charge Pump with Active Cycle Regulation—Closing the Gap between Linear-and Skip Modes", 2000 IEEE, pp. 1497-1502.

* cited by examiner

*Primary Examiner* — Adolf Berhane
*Assistant Examiner* — Fred E Finch, III

(57) ABSTRACT

A system and a method are disclosed for providing a dynamically configured low drop out regulator that has zero quiescent current and a fast transient response. A power supply control circuit is provided that comprises a switcher circuit and a low drop out regulator and a control signal circuit. When the output voltage of the low drop out regulator is in a steady state condition the control signal circuit generates control signals that turn off the operation of the low drop out regulator to provide zero quiescent current. When the output voltage is not in a steady state condition the control signal circuit generates control signals that turn on the operation of the low drop out regulator to provide a fast transient response.

21 Claims, 5 Drawing Sheets

SYSTEM AND METHOD FOR PROVIDING A DYNAMICALLY CONFIGURED LOW DROP OUT REGULATOR WITH ZERO QUIESCENT CURRENT AND FAST TRANSIENT RESPONSE

CROSS-REFERENCE TO RELATED APPLICATION

The present invention is related to an invention described and claimed in a patent application entitled "System and Method for Suppressing Load Transients in Radio Frequency Power Amplifier Switching Power Supplies" filed on the same date of the present patent application and assigned to the assignee of the present patent application as patent application Ser. No. 12/008,843.

TECHNICAL FIELD OF THE INVENTION

The present invention is generally directed to the manufacture of semiconductor circuits and, in particular, to a system and method for providing a dynamically configured low drop out regulator circuit.

BACKGROUND OF THE INVENTION

The telecommunications industry continually attempts to improve the transmitter circuitry in wireless communication systems. Power amplifier (PA) circuitry is a major component of a transmitter of a wireless communication device. Power amplifier (PA) circuitry provides the power for transmitting a signal (including data modulated and carried by the signal) so that a base station or a receiver can receive the signal.

Power amplifier (PA) circuitry uses a large amount of power. The power amplifier (PA) module is one of the most power consuming components of a wireless communication device. Therefore it is very desirable to provide power amplifier (PA) circuitry that is power efficient.

One method for improving power amplifier (PA) efficiency is to use a drain/collector modulation technique. In the drain/collector modulation technique a non-linear high efficiency power amplifier can be used (e.g., a class C power amplifier) instead of a linear low efficiency power amplifier (e.g., a class A amplifier). The power control of the power amplifier (PA) circuitry is achieved by adjusting the power amplifier (PA) power supply $V_{CC}$. A high efficiency power supply combined with a high efficiency power amplifier (PA) (with constant bias) would be ideal.

In prior art power amplifier (PA) modules in GSM (Global System for Mobile Communications) telecommunication devices such as RF3110 (manufactured by RFMD) and TQM7M4014 (manufactured by Triquint), the power amplifier (PA) power supply $V_{CC}$ is from a linear regulator or "low drop out" (LDO) circuit. An LDO circuit can have a high efficiency when the value of its output voltage ($V_{CC}$) is near the value of its input voltage ($V_{BATT}$). But an LDO circuit will have a very low efficiency when its output voltage ($V_{CC}$) is very low compared with its input voltage ($V_{BATT}$).

The maximum efficiency for an LDO circuit is the ratio of the output voltage $V_{CC}$ to the input voltage $V_{BATT}$. That is, the maximum efficiency is given by the ratio $V_{CC}/V_{BATT}$. For example, the maximum efficiency for an LDO in a typical GSM handset with an output voltage of nine tenths volts ($V_{CC}$=0.9 volts) and an input voltage of three and six tenths volts ($V_{BATT}$=3.6 volts) is twenty five percent (25%).

FIG. 1 illustrates a schematic diagram of a first prior art power supply control circuit 100. Power supply control circuit 100 comprises a low drop out (LDO) circuit 110. Low drop out (LDO) circuit 110 comprises an operational amplifier 120 that receives a $V_{RAMP}$ signal on its inverting input. A feedback voltage signal $V_{FB}$ is provided to the non-inverting input of operational amplifier 120. The operating voltage for low drop out (LDO) circuit 110 is provided by a voltage source $V_{BATT}$.

The output of operational amplifier 120 is provided to a gate of a PMOS transistor 140. The source of PMOS transistor 140 is coupled to the operating voltage $V_{BATT}$. The drain of PMOS transistor 140 is coupled to a first end of a first resistor 150. The second end of first resistor 150 is coupled to a first end of a second resistor 160. The second end of second resistor 160 is coupled to ground. The feedback voltage signal $V_{FB}$ is obtained from a node between the first resistor 150 and the second resistor 160.

The output of low drop out (LDO) circuit 110 is the power supply voltage $V_{CC}$. A capacitor 170 is coupled between the output of the low drop out (LDO) circuit and ground. The power supply voltage $V_{CC}$ is provided to radio frequency (RF) power amplifier (PA) 130. Radio frequency (RF) power amplifier (PA) 130 amplifies an RF input signal ($RF_{IN}$) to generate an amplified RF output signal ($RF_{OUT}$).

One method for increasing the efficiency of the power amplifier (PA) power supply $V_{CC}$ is to use a switching regulator. A switching regulator is able to adjust the value of the operating voltage (designated $V_{SWITCHER}$) that is provided to a low drop out circuit. FIG. 2 illustrates a schematic diagram of a second prior art power supply control circuit 200 that comprises a switching regulator 210 (designated "switcher 210"). Switcher 210 has a first input that receives a peak value of voltage (designated $V_{PEAK}$) and a second input that receives an enable signal (designated $EN_{SWITCHER}$).

The low drop out circuit 110 in FIG. 2 has the same structure as the low drop out circuit 110 shown in FIG. 1. However, the operation of the low drop out circuit 110 in FIG. 2 no longer has a single value of operating voltage $V_{BATT}$. Instead, switcher 210 provides a wide dynamic range of operating voltages $V_{SWITCHER}$ to the low drop out circuit 110. For example, the value of the operating voltage $V_{SWITCHER}$ may be chosen in a range from about four hundred millivolts (400 mV) to about four and eight tenths volts (4.8 V).

FIG. 3 illustrates a schematic diagram of a third prior art power supply control circuit 300. Power supply control circuit 300 comprises a switching regulator 304 (designated "switcher 304") and a low drop out (LDO) circuit 306. As shown in FIG. 3, switcher 304 low drop out (LDO) circuit 306 both receive the $V_{RAMP}$ voltage. Both switcher 304 and low drop out (LDO) circuit 306 also receive a $V_{BATT}$ voltage. In addition, the low drop out (LDO) circuit 306 receives a transmit enable signal (designated "TX_EN"). When the transmit enable signal TX_EN is high, the low drop out (LDO) circuit 306 sends the power supply $V_{CC}$ to the power amplifier 302.

In the power supply control circuit 300 of FIG. 3 the output of the switcher 304 (designated "$V_{SWITCHER}$") is set to a direct current (DC) level that represents the peak level of $V_{CC}$ by the control signal $V_{PEAK}$. A typical value for the $V_{SWITCHER}$ voltage for a GSM full power condition may be four and nine tenths volts (4.9 V). A typical value for the $V_{PEAK}$ voltage for a GSM full power condition may be one and six tenths volts (1.6 V) for a steady state operation. The wide bandwidth low drop out (LDO) circuit 306 is used for polar modulation envelope tracking and for providing a fast response to the reference control signal $V_{RAMP}$. FIG. 4 illustrates the timing waveforms 400 that would be expected for a low drop out (LDO) circuit 306 in a GSM (Global System for Mobile Communications)/EDGE telecommunication device.

In a wideband code division multiple access (WCDMA) mode the power supply $V_{CC}$ for the radio frequency (RF) power amplifier (PA) 302 is required to slew within fifty microseconds (50 µs) in order to follow a power level change. The worst case occurs when the power supply $V_{CC}$ must slew from a minimum value to a maximum value (and vice versa). The power level of the radio frequency (RF) power amplifier (PA) 302 is in its low power mode (e.g., zero (0) dBm) most of the time. In order to extend battery life it is very important that the $V_{CC}$ provider be very efficient with respect to the low output power condition.

In the power supply control circuit 300 that is shown in FIG. 3 the switcher output is set to a direct current (DC) level that represents the peak level of the VCC voltage with a control signal VPEAK. The wide bandwidth low drop out (LDO) circuit 306 is used for polar modulation envelope tracking and fast response to the commanding reference control signal VRAMP. An output filter having a large value of capacitance may be provided at the output of the switcher 304 to minimize the load transient at the moment that the power amplifier (PA) 302 is turned on.

The switcher voltage $V_{SWITCHER}$ or the output voltage $V_{CC}$ could be used to provide power to the power amplifier (PA) 302. Assume that the switcher voltage $V_{SWITCHER}$ is used to provide power to the power amplifier (PA) 302. Then the large output capacitance at the output of the switcher 304 means that the switcher voltage $V_{SWITCHER}$ may not be able to meet the rising and falling slew rate specification (of fifty microseconds (50 µs)) for the wideband code division multiple access (WCDMA) mode.

One method to solve this problem is to use the low drop out (LDO) regulator 306 to handle the slew rate requirement in the WCDMA mode. In this method the switcher 304 is started ahead of time by using a switcher enable signal $EN_{SWITCHER}$. This "early start" enables the value of the $V_{SWITCHER}$ signal to settle before the desired $V_{CC}$ change is commanded by the $V_{RAMP}$ signal. When the $V_{CC}$ slew is required, the low drop out (LDO) regulator 306 will force its output $V_{CC}$ to follow the $V_{RAMP}$ signal. This is true for both a rising $V_{CC}$ signal and a falling $V_{CC}$ signal as long as the $V_{SWITCHER}$ signal is higher than the $V_{CC}$ signal.

As shown in FIG. 4, the switcher enable signal $EN_{SWITCHER}$ is turned on in advance of the transmit enable signal TX_EN so that the value of the $V_{SWITCHER}$ signal settles at its high value before the transmit enable signal TX_EN causes the low drop out (LDO) circuit 306 to send the power supply $V_{CC}$ to the power amplifier 302. The value of the $V_{RAMP}$ signal usually ramps up very quickly. For example, it may increase from a zero value to a maximum value in approximately five microseconds (5 µsec). This will cause the switcher load to go from a no load condition of zero milliamperes (0 mA) to a maximum load condition of approximately two amperes (2 A).

The method described above will solve the slew rate problem. However, the low drop out (LDO) regulator 306 will introduce a certain level of quiescent current (having a current magnitude in the milliampere (mA) range). This quiescent current is a dominant loss source at the low power condition of the power supply control circuit 300. That is, the quiescent current causes the power supply control circuit 300 to have a low efficiency at the low power condition.

It is desirable to have a low drop out (LDO) regulator 306 that has a low value of quiescent current. It is also desirable to have a low drop out (LDO) regulator 306 that has a wide bandwidth for providing a fast transient response in a wideband code division multiple access (WCDMA) mode. However, these two desirable requirements (low quiescent current and fast transient response) are in conflict with each other.

Therefore, there is a need in the art for a system and method that is capable of providing a remedy for these prior art deficiencies. In particular, there is a need in the art for a system and method that is capable of providing an improved architecture for a power supply control circuit that dynamically provides both a zero quiescent current and a fast transient response.

SUMMARY OF THE INVENTION

To address the above-discussed deficiencies of the prior art, it is a primary object of the present invention to provide a system and method for providing a power supply control circuit that is capable of operating with a zero quiescent current and that provides a fast transient response for a radio frequency power amplifier switching power supply.

One advantageous embodiment of the power supply control circuit of the invention comprises a switcher circuit and a low drop out regulator circuit and a control signal circuit. The power supply control circuit determines whether the output voltage of the low drop out regulator circuit is in a steady state condition. When the output voltage is in a steady state condition the control signal circuit generates control signals that turn off the operation of the low drop out regulator circuit.

When the output voltage is not in a steady state condition the control signal circuit generates control signals that turn on the operation of the low drop out regulator circuit. In this manner the operation of the low drop out regulator circuit is turned on when a fast transient response is needed and the operation of the low drop out regulator circuit is turned off when the output voltage is in a steady state condition.

It is an object of the present invention to provide a system and method for providing an improved power supply control circuit that remedies deficiencies that are present in prior art power supply control circuits.

It is also an object of the present invention to provide a system and method for providing an improved power supply control circuit that can dynamically operate a low drop out regulator circuit.

It is yet another object of the present invention to provide a system and method for an improved power supply control circuit that comprises a control signal circuit that generates control signals to control the operation of a low drop out regulator circuit.

It is also another object of the present invention to provide a system and method for an improved power supply control circuit that comprises a low drop out regulator circuit that operates with zero quiescent current and that provides a fast transient response.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
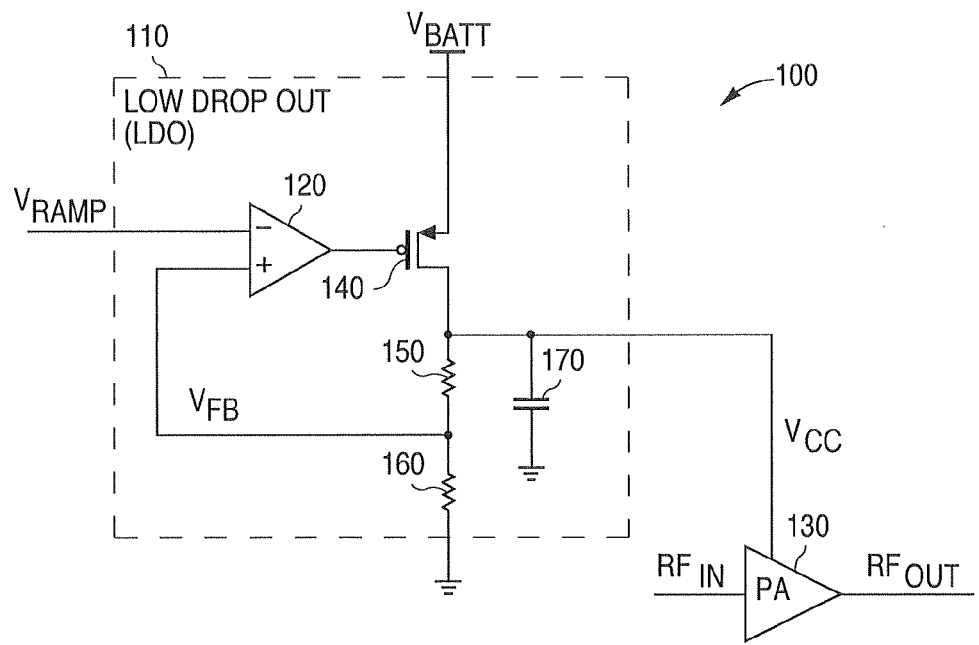
FIG. 1 illustrates a schematic diagram of a first prior art power supply control circuit.
Figure 2:
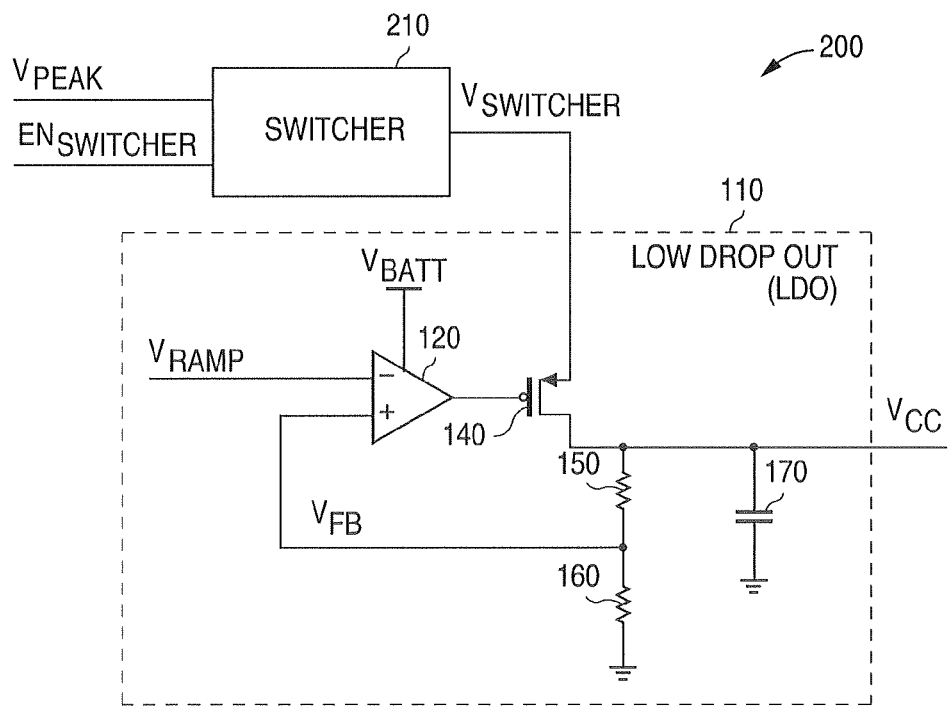
FIG. 2 illustrates a schematic diagram of a second prior art power supply control circuit.
Figure 3:
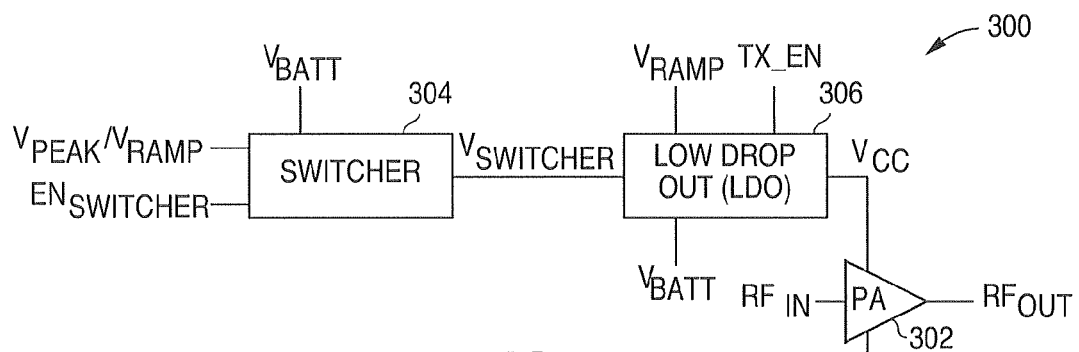
FIG. 3 illustrates a schematic diagram of a third prior art power supply control circuit.
Figure 4:
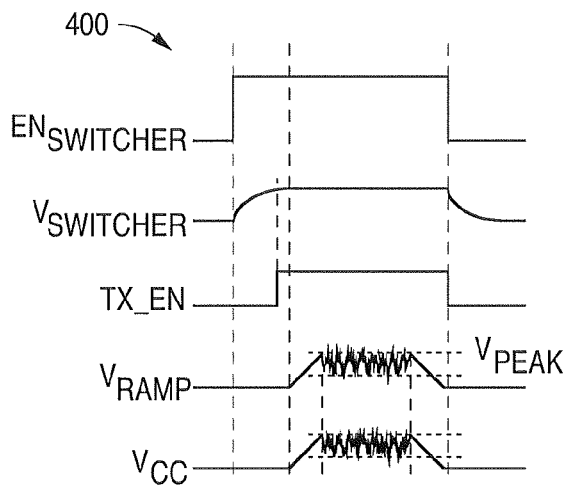
FIG. 4 illustrates exemplary timing waveforms of a prior art power supply control circuit.

FIGS. 1 through 8 and the various embodiments used to describe the principles of the present invention in this patent document are by way of illustration only and should not be construed in any way to limit the scope of the invention. Those skilled in the art will understand that the principles of the present invention may be implemented in any type of suitably arranged power amplifier circuit.

To simplify the drawings the reference numerals from previous drawings will sometimes not be repeated for structures that have already been identified.

The present invention (1) uses the low drop out (LDO) regulator when a fast transient response is needed and (2) completely shuts down the operation of the low drop out (LDO) regulator when the power supply control voltage $V_{CC}$ is in a steady state condition. The manner in which these steps are accomplished will be described more fully below.

Figure 6:
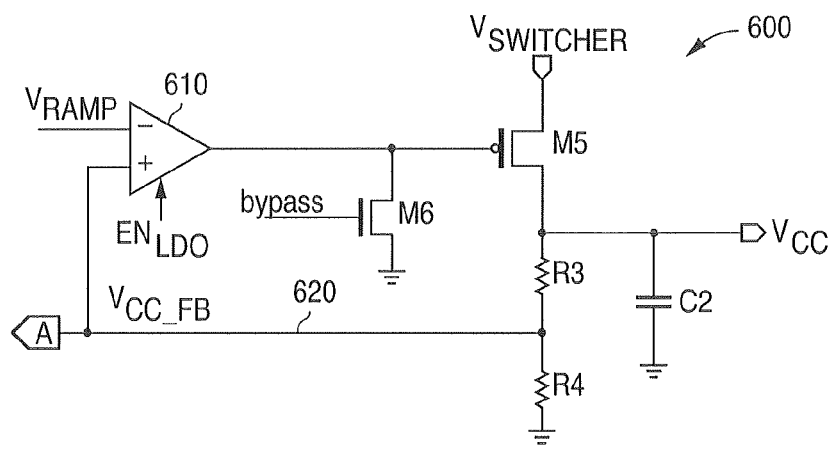
FIG. 6 illustrates a schematic diagram of an advantageous embodiment of a low drop out (LDO) circuit of the present invention.
Figure 7:
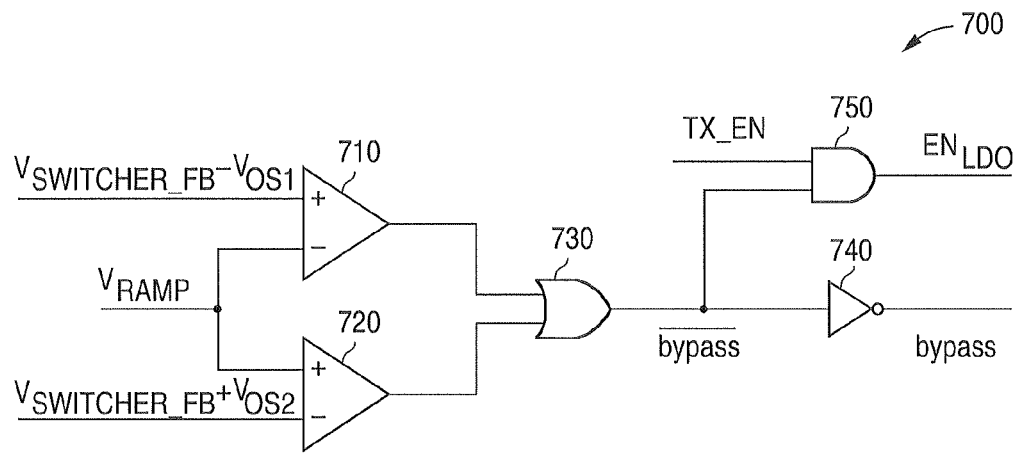
FIG. 7 illustrates a schematic diagram of an advantageous embodiment of a control signal circuit that generates at least one control signal in accordance with the principles of the present invention.

An advantageous embodiment of a power supply control circuit of the present invention comprises (1) a buck/boost switcher circuit and (2) a low drop out (LDO) circuit constructed in accordance with the principles of the present invention. The advantageous embodiment of the power supply control circuit of the present invention is illustrated in FIGS. 5, 6, and 7.

Figure 5:
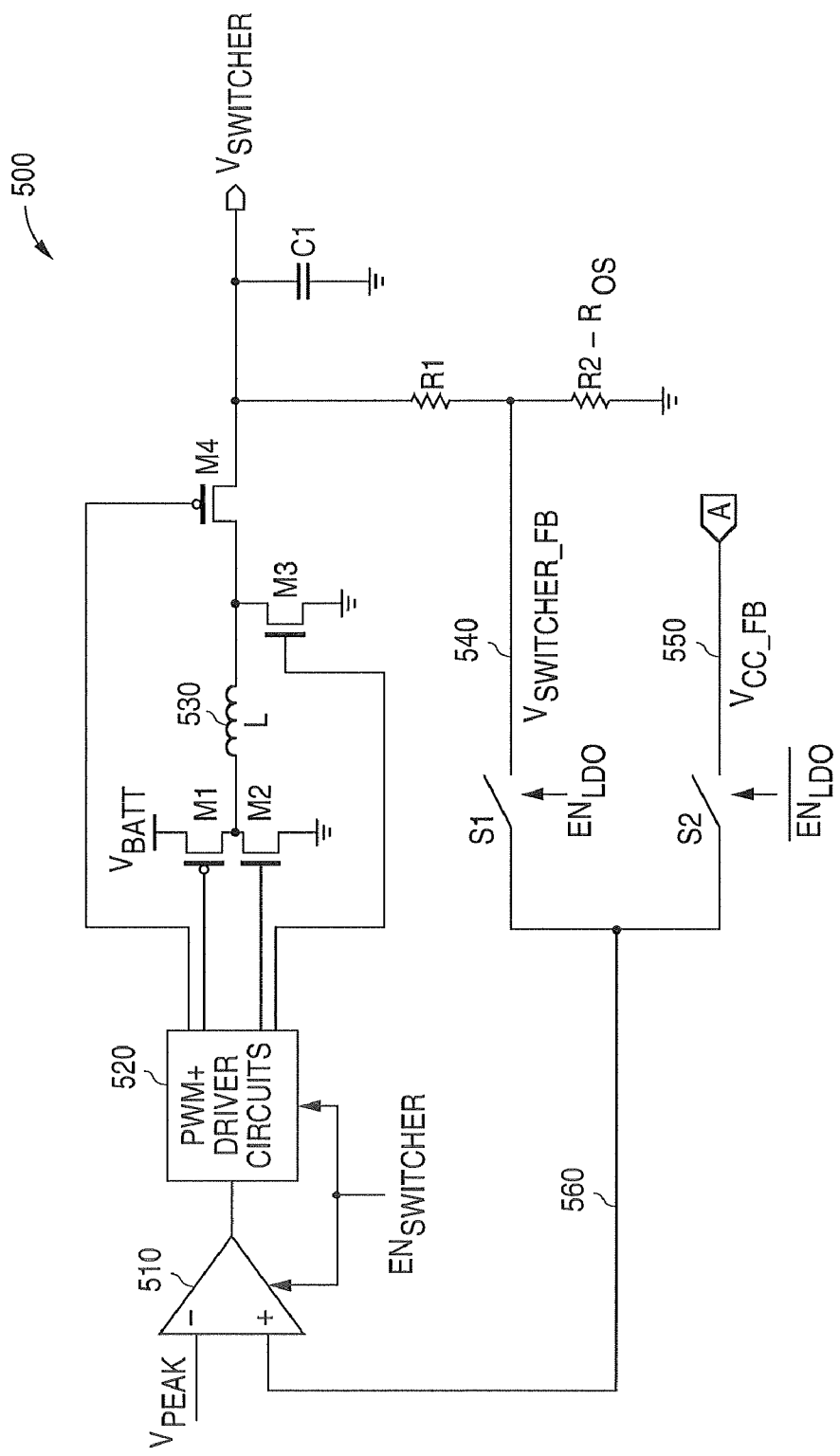
FIG. 5 illustrates a schematic diagram of an advantageous embodiment of a switcher circuit of the present invention.

FIG. 5 illustrates a schematic diagram of an advantageous embodiment of a switcher circuit 500 constructed in accordance with the principles of the present invention. FIG. 6 illustrates a schematic diagram of an advantageous embodiment of a low drop out (LDO) circuit 600 constructed in accordance with the principles of the present invention. The output of the switcher circuit 500 is the voltage that appears at the output node that is designated $V_{SWITCHER}$. The $V_{SWITCHER}$ voltage is provided as an input to the low drop out (LDO) circuit 600. The output of the low drop out (LDO) circuit 600 is the voltage that appears at the output node that is designated $V_{CC}$. The output voltage $V_{CC}$ is provided to a power amplifier (PA) that is not shown in FIG. 6.

The switcher circuit 500 comprises a buck-boost switcher circuit that comprises an error amplifier 510 and pulse width modulation (PWM) circuits and driver circuits 520. The inverting input of the error amplifier 510 receives the $V_{PEAK}$ voltage signal and the non-inverting input of the error amplifier 510 receives either a feedback voltage signal $V_{SWITCHER\_FB}$ or a feedback voltage signal $V_{CC\_FB}$.

The output of the error amplifier 510 is provided as an input to the PWM and driver circuits 520. As shown in FIG. 5, the enable switcher signal $EN_{SWITCHER}$ is provided to control the operation of the error amplifier 510 and the PWM and driver circuits 520.

A first output line from the PWM and driver circuits 520 controls the operation of a first P-type metal oxide semiconductor (PMOS) transistor M1. A second output line from the PWM and driver circuits 520 controls the operation of a first N-type metal oxide semiconductor (NMOS) transistor M2. A third output line from the PWM and driver circuits 520 controls the operation of a second N-type metal oxide semiconductor (NMOS) transistor M3. A fourth output line from the PWM and driver circuits 520 controls the operation of a second P-type metal oxide semiconductor (PMOS) transistor M4.

The PMOS transistor M1 and the NMOS transistor M2 are connected together as shown in FIG. 5 and are connected to a first end of inductor 530. Power is supplied to the PMOS transistor M1 and to the NMOS transistor M2 by the battery voltage $V_{BATT}$. A typical value of battery voltage is three and six tenths volts (3.6 V). The NMOS transistor M3 and the PMOS transistor M4 are connected together as shown in FIG. 5 and are connected to a second end of inductor 530.

A first end of a first feedback resistor R1 is connected to a node that is located between the PMOS transistor M4 and the $V_{SWITCHER}$ output node. A first end of an output capacitor C1 is connected to a node that is located between the first feedback resistor R1 node and the $V_{SWITCHER}$ output node. A second end of output capacitor C1 is connected to ground.

A second end of the first feedback resistor R1 is connected to a first end of a second feedback resistor that is designated R2-$R_{OS}$. A second end of the second feedback resistor R2-$R_{OS}$ is connected to ground.

A feedback line 540 connects the node between the first feedback resistor R1 and the second feedback resistor R2-$R_{OS}$ with the non-inverting input of the error amplifier 510 through switch S1 and feedback line 560. The switch S1 is operated by an enable LDO signal (designated $EN_{LDO}$). When the $EN_{LDO}$ signal goes high the $EN_{LDO}$ signal closes switch S1. The manner in which the $EN_{LDO}$ signal is generated will be described later in this document.

As shown in FIG. 5, a feedback voltage signal $V_{CC\_FB}$ from Node A may also be provided to the non-inverting input of the error amplifier 510. A feedback line 550 connects Node A with the non-inverting input of the error amplifier 510 through switch S2 and feedback line 560. The switch S2 is operated by an inverted version of the enable LDO signal (designated as an $EN_{LDO}$ bar signal). When the $EN_{LDO}$ signal goes high, then the $EN_{LDO}$ bar signal goes low and closes switch S2. The manner in which the $EN_{LDO}$ bar signal is generated will also be described later in this document.

Therefore the non-inverting input of the error amplifier 510 will receive either the feedback voltage signal $V_{SWITCHER\_FB}$ or the feedback voltage signal $V_{CC\_FB}$. If the enable LDO signal $EN_{LDO}$ is high, then the non-inverting input of the error amplifier 510 will receive the feedback voltage signal $V_{SWITCHER\_FB}$. If the enable LDO signal $EN_{LDO}$ is low, then the non-inverting input of the error amplifier 510 will receive the feedback voltage signal $V_{CC\_FB}$.

A typical value of resistance for the first feedback resistor R1 is two hundred thousand ohms (200 kΩ). A typical value of resistance for a second feedback resistor R2 is one hundred thousand ohms (100 kΩ) and a typical value of resistance for an offset resistor ($R_{OS}$) is nine thousand ohms (9 kΩ). Therefore, a typical value of resistance for the second feedback resistor R2–$R_{OS}$ is ninety one thousand ohms (91 kΩ).

The presence of an offset resistor $R_{OS}$ reflects the necessity for elevating the $V_{SWITCHER}$ voltage above the $V_{CC}$ voltage in order to provide the $V_{SWITCHER}$ overhead voltage. This can be accomplished by reducing the magnitude of the resistance between node 540 and ground. If the resistance R2 would program the $V_{SWITCHER}$ voltage to be the same as the $V_{CC}$ voltage, then it is expected that replacing the R2 resistor with a resistance value of (R2 minus $R_{OS}$) will program the $V_{SWITCHER}$ voltage to be a voltage that is equal to ($V_{CC}$ voltage plus $V_{SWITCHER}$ overhead voltage). That is why a resistance value of R2–$R_{OS}$ is used between the node 540 and ground in FIG. 5.

As previously mentioned, FIG. 6 illustrates a schematic diagram of an advantageous embodiment of a low drop out (LDO) circuit 600 of the invention. Low drop out (LDO) circuit 600 comprises an error amplifier 610. The inverting input of the error amplifier 610 receives the $V_{RAMP}$ voltage signal and the non-inverting input of the error amplifier 610 receives the feedback voltage signal $V_{CC\_FB}$. The output of the error amplifier 610 is provided as an input to the gate of a third P-type metal oxide semiconductor (PMOS) transistor M5. As shown in FIG. 6, the enable LDO signal $EN_{LDO}$ is provided to control the operation of the error amplifier 610.

The source of PMOS transistor M5 is connected to the $V_{SWITCHER}$ voltage that is provided as an input to the low drop out (LDO) circuit 600. The PMOS transistor M5 acts as the load for the switcher circuit 500. The drain of the PMOS transistor M5 is connected to the output voltage node $V_{CC}$. The drain of the PMOS transistor M5 is also connected to a first end of a third feedback resistor R3. A first end of an output capacitor C2 is connected to the $V_{CC}$ output node. A second end of output capacitor C2 is connected to ground.

A second end of the third feedback resistor R3 is connected to a first end of a fourth feedback resistor that is designated R4. A second end of fourth feedback resistor R4 is connected to ground. A feedback line 620 connects the node between the third feedback resistor R3 and the fourth feedback resistor R4 with the non-inverting input of the error amplifier 610 and with Node A.

The low drop out (LDO) circuit 600 also comprises a third N-type metal oxide semiconductor (NMOS) transistor M6 that has a source that is connected to a node that is located between the output of the error amplifier 610 and the gate of PMOS transistor M5. The drain of the NMOS transistor M6 is connected to ground. The gate of the NMOS transistor M6 is connected to a bypass signal. The bypass signal controls the operation of NMOS transistor M6. The manner in which the bypass signal is generated will be described later in this document.

In the steady state operation of the power supply control circuit of the present invention the value of the $V_{SWITCHER}$ is set slightly higher than the value of the targeted output voltage value $V_{CC}$ in order to accommodate the low drop out (LDO) voltage. The offset voltage is defined as the difference between the $V_{SWITCHER}$ voltage and the output voltage $V_{CC}$. That is, the offset voltage is equal to the $V_{SWITCHER}$ voltage minus the output voltage $V_{CC}$. The offset voltage may also be referred to as the $V_{SWITCHER}$ overhead voltage.

The power supply control circuit of the present invention generates two control signals. The first control signal is designated as the enable LDO signal ($EN_{LDO}$ signal) and the second control signal is designated as the bypass signal. As will be more fully described, the enable LDO signal ($EN_{LDO}$ signal) is used to activate the low drop out (LDO) regulator and the bypass signal is used to deactivate the low drop out (LDO) regulator. The manner in which these control signals are generated will now be described.

FIG. 7 illustrates an advantageous embodiment of a control signal circuit 700 that generates both the enable LDO signal ($EN_{LDO}$ signal) and the bypass signal. The control signal circuit 700 comprises a first comparator 710, a second comparator 720, an OR logic gate 730, and inverter 740 and an AND logic gate 750. The non-inverting input of the first comparator 710 receives a signal that is equal to the feedback voltage $V_{SWITCHER\_FB}$ signal minus a value of offset voltage $V_{OS1}$. The inverting input of the first comparator 710 receives the ramp voltage signal $V_{RAMP}$. The output of the first comparator 710 is provided to a first input of the OR logic gate 730.

The inverting input of the second comparator 720 receives a signal that is equal to the feedback voltage $V_{SWITCHER\_FB}$ signal plus a value of offset voltage $V_{OS2}$. The non-inverting input of the second comparator 720 receives the ramp voltage signal $V_{RAMP}$. The output of the second comparator 720 is provided to a first input of the OR logic gate 730.

The output of the OR logic gate 730 is designated as the inverse of the bypass signal. Therefore, when the output of the OR logic gate 730 is provided to the inverter 740, the output of the inverter circuit 740 is the bypass signal. The output of the OR logic gate 730 is also provided to a first input of the AND logic gate 750. The second input of the AND logic gate 750 receives the transmit enable signal TX_EN. The output of the AND logic gate 750 is designated as the enable LDO signal ($EN_{LDO}$).

The function of the first comparator 710 and the second comparator 720 is to determine whether the switcher voltage $V_{SWITCHER}$ is in regulation or not. If the switcher voltage $V_{SWITCHER}$ is in regulation and in a steady state condition, then the control signal circuit 700 generates signals to turn off the low drop out (LDO) circuit 600. Specifically, the enable LDO signal ($EN_{LDO}$) goes low and the bypass signal goes high. The high bypass signal activates the NMOS transistor M6 to pull down the gate of the PMOS transistor M5 and cause the PMOS transistor M5 to act as a resistor.

Conversely, if the switcher voltage $V_{SWITCHER}$ is not in regulation and not in a steady state condition, then the low drop out (LDO) regulator 600 needs to be turned on to force the output voltage $V_{CC}$ to follow the $V_{RAMP}$ voltage. Then the control signal circuit 700 generates signals to turn on the low drop out (LDO) regulator 600. Specifically, the enable LDO signal ($EN_{LDO}$) goes high and the bypass signal goes low. The low bypass signal then deactivates the NMOS transistor M6. After the output voltage $V_{CC}$ is in the steady state condition, the output of the comparators 710 and 720 will be low and the low drop out (LDO) regulator 600 will be turned off.

The present invention uses the low drop out (LDO) regulator 600 when a fast transient response is needed and completely shuts down the operation of the low drop out (LDO) regulator 600 when the power supply control voltage $V_{CC}$ is in a steady state.

Figure 8:
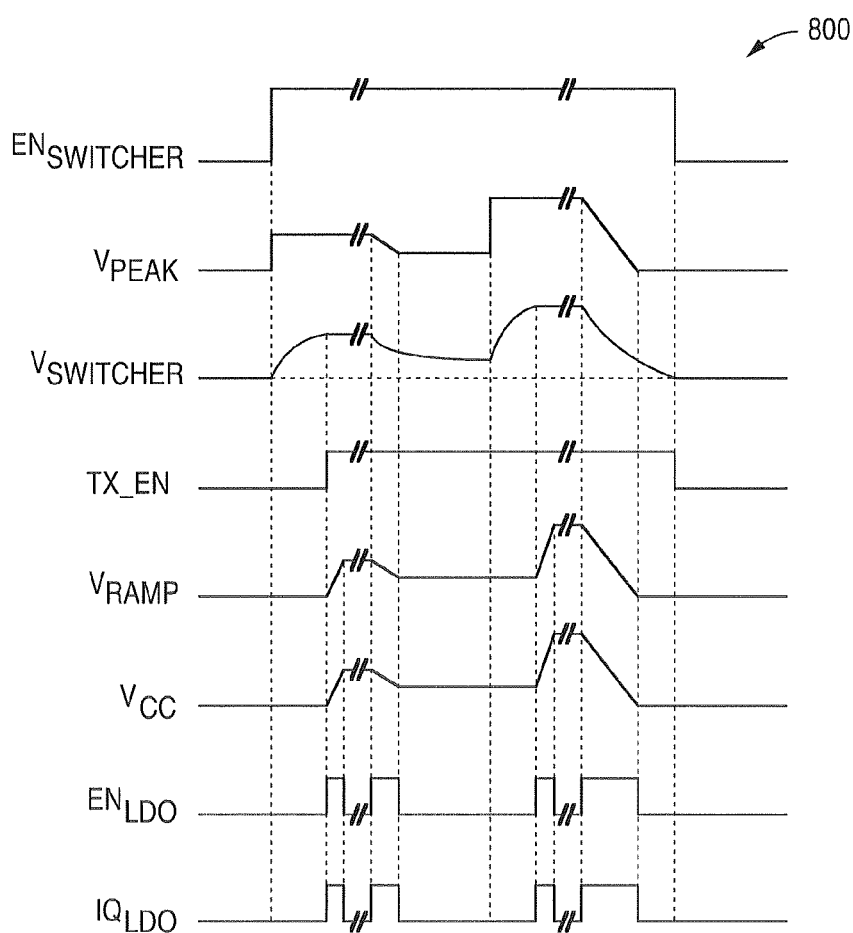
FIG. 8 illustrates timing waveforms that occur in the power supply control circuit that is shown in FIG. 5 and in FIG. 6 and in FIG. 7.

FIG. 8 illustrates timing waveforms 800 that occur in the power supply control circuit that is shown in FIG. 5 and in FIG. 6 and in FIG. 7. As shown in FIG. 8, the value of the $V_{PEAK}$ voltage and the value of the $V_{RAMP}$ voltage are the same in the steady state. The timing waveform that is designated $IQ_{LDO}$ represents the current through the low drop out (LDO) regulator 600.

In the control signal circuit 700 that is shown in FIG. 7 the second input to the AND logic gate 750 is the transmit enable signal TX_EN. In an alternate advantageous embodiment of the invention, the transmit enable signal TX_EN can be replaced with the switcher enable signal $EN_{SWITCHER}$. This would cause the low drop out (LDO) regulator 600 to be turned on earlier (and for a longer time) than the case in which the transmit enable signal TX_EN is used as the gating signal. This alternate approach may not cause a problem as long as the output voltage $V_{CC}$ is following the ramp voltage $V_{RAMP}$. The energy that is used by the low drop out (LDO) regulator 600 being in an "on" condition for a longer time may have a minimal impact over a long time scale.

The present invention may also be used to turn on the low drop out (LDO) regulator 600 all the time. This may be accomplished by setting the value of the $V_{PEAK}$ voltage slightly higher than the $V_{RAMP}$ voltage.

The present invention may also be used to turn off the low drop out (LDO) regulator 600 all the time. This may be accomplished by setting the value of the $V_{RAMP}$ voltage equal to the $V_{PEAK}$ voltage.

Depending upon the values that are set for the voltages, the present invention may therefore be operated in three distinct modes. The first mode is one in which the low drop out (LDO) regulator 600 is dynamically turned on and off. The second mode is one in which the low drop out (LDO) regulator 600 is fully turned "on" all of the time. The third mode is one in which the low drop out (LDO) regulator 600 is fully turned "off" all of the time.

The principles of the present invention have been described for a device that operates with power amplifier (PA) modules in WCDMA (Wideband Code Division Multiple Access) telecommunication devices. It is understood that the principles of the present invention are also applicable to power amplifier (PA) modules in GSM (Global System for Mobile Communications)/EDGE telecommunication devices. The present invention is not limited to one type of telecommunication device.

Figure 9:
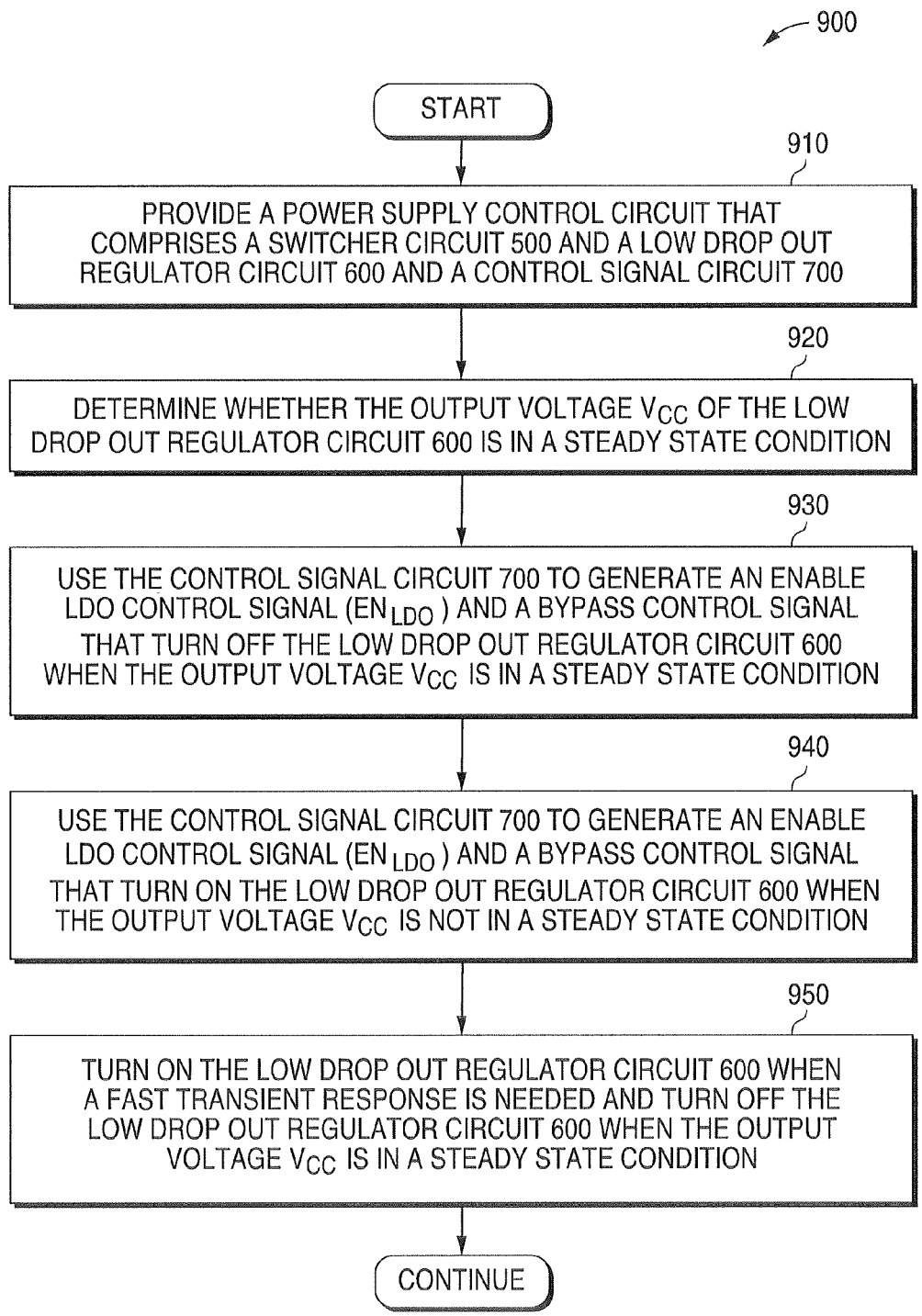
FIG. 9 illustrates a flow chart showing the steps of an advantageous embodiment of the method of the present invention.

FIG. 9 illustrates a flow chart showing the steps 900 of an advantageous embodiment of the method of the present invention. In the first step of the method a power supply control circuit is provided that comprises a switcher circuit 500 and a low drop out regulator circuit 600 and a control signal circuit 700 (step 910).

Then a determination is made whether the output voltage $V_{CC}$ of the low drop out regulator circuit 600 is in a steady state condition (step 920). Then the control signal circuit 700 is used to generate an enable LDO control signal ($EN_{LDO}$) and a bypass control signal that turn off the low drop out regulator circuit 600 when the output voltage $V_{CC}$ is in a steady state condition (step 930).

Then the control signal circuit 700 is used to generate an enable LDO control signal ($EN_{LDO}$) and a bypass control signal that turn on the low drop out regulator circuit 600 when the output voltage VCC is not in a steady state condition (step 940). The low drop out regulator circuit 600 is turned on when a fast transient response is needed and the low drop out regulator circuit 600 is turned off when the output voltage $V_{CC}$ is in a steady state condition (step 950).

Although the present invention has been described with an exemplary embodiment, various changes and modifications may be suggested to one skilled in the art. It is intended that the present invention encompass such changes and modifications as fall within the scope of the appended claims.

What is claimed is:

1. A power supply control circuit comprising:
  a low drop out circuit comprising an operational amplifier, the operational amplifier having an output configured to be coupled to a low drop out transistor for generating a power supply output voltage at a first source/drain terminal of the low drop out transistor;
  a switcher circuit having an output configured to be coupled to a second source/drain terminal of the low drop out transistor and to provide a switcher operating voltage to the low drop out transistor; and
  control signal circuitry configured to regulate an operation of the low drop out circuit, the control signal circuitry further configured to turn off the low drop out circuit when the power supply output voltage is in a steady state condition;
  wherein the control signal circuitry is configured to generate (i) a low drop out enable signal controlling whether the operational amplifier is enabled or disabled and (ii) a bypass signal controlling whether a bypass transistor couples a gate of the low drop out transistor to ground.

2. The power supply control circuit as set forth in claim 1, wherein the control signal circuitry is configured to determine whether the power supply output voltage is in the steady state condition.

3. The power supply control circuit as set forth in claim 2, wherein the control signal circuitry is configured to turn on the low drop out circuit when the power supply output voltage is not in the steady state condition.

4. The power supply control circuit as set forth in claim 2, wherein the control signal circuitry is configured to generate the low drop out enable signal having a high logical level and the bypass signal having a low logical level when the output voltage of the low drop out circuit is not in the steady state condition.

5. The power supply control circuit as set forth in claim 4, wherein the control signal circuitry is configured to use the low drop out enable signal and the bypass signal to turn on the low drop out circuit.

6. The power supply control circuit as set forth in claim 5, wherein the control signal circuitry is configured to use the low drop out enable signal to close a switch in the switcher circuit to couple a feedback voltage from the switcher circuit to an error amplifier of the switcher circuit.

7. The power supply control circuit as set forth in claim 2, wherein the control signal circuitry is configured to generate the low drop out enable signal having a low logical level and the bypass signal having a high logical level when the output voltage of the low drop out circuit is in the steady state condition.

8. The power supply control circuit as set forth in claim 7, wherein the control signal circuitry is configured to use the low drop out enable signal and the bypass signal to turn off the low drop out circuit.

9. The power supply control circuit as set forth in claim 8, wherein the control signal circuitry is configured to use the low drop out enable signal to close a switch in the switcher circuit to couple a feedback voltage from the low drop out circuit to an error amplifier of the switcher circuit.

10. A power supply control circuit comprising:
a low drop out circuit comprising an operational amplifier, the operational amplifier having an output configured to be coupled to a low drop out transistor;
a switcher circuit configured to provide a switcher operating voltage to the low drop out transistor; and
control signal circuitry configured to regulate an operation of the low drop out circuit, the control signal circuitry further configured to determine whether an output voltage of the low drop out circuit is in a steady state condition and to turn off the low drop out circuit when the output voltage of the low drop out circuit is in the steady state condition;
wherein the control signal circuitry comprises an inverter configured to generate a bypass signal and a logical AND gate configured to generate a low drop out enable signal.

11. A power supply control circuit comprising:
a low drop out circuit comprising (i) an operational amplifier having an output configured to be coupled to a low drop out transistor and (ii) a bypass transistor configured to couple a gate of the low drop out transistor to ground;
a switcher circuit configured to provide a switcher operating voltage to the low drop out transistor; and
control signal circuitry configured to generate at least one control signal that turns off the low drop out circuit and causes the bypass transistor to couple the gate of the low drop out transistor to ground when an output voltage of the low drop out circuit is in a steady state condition;
wherein the control signal circuitry is configured to disable the operational amplifier and activate the bypass transistor when the output voltage of the low drop out circuit is in the steady state condition; and
wherein the control signal circuitry is configured to enable the operational amplifier and deactivate the bypass transistor when the output voltage of the low drop out circuit is not in the steady state condition.

12. The power supply control circuit as set forth in claim 11, wherein the low drop out circuit is configured to generate zero quiescent current when the low drop out circuit is turned off.

13. The power supply control circuit as set forth in claim 11, wherein the control signal circuitry is further configured to generate at least one control signal that turns on the low drop out circuit when the output voltage of the low drop out circuit is not in the steady state condition.

14. The power supply control circuit as set forth in claim 13, wherein the low drop out circuit is configured to provide a fast transient response when the low drop out circuit is turned on.

15. A power supply control circuit comprising:
a low drop out circuit comprising an operational amplifier, the operational amplifier having an output configured to be coupled to a low drop out transistor;
a switcher circuit configured to provide a switcher operating voltage to the low drop out transistor; and
control signal circuitry configured to generate at least one control signal that turns off the low drop out circuit when an output voltage of the low drop out circuit is in a steady state condition;
wherein the control signal circuitry comprises an inverter configured to generate a bypass signal and a logical AND gate configured to generate a low drop out enable signal.

16. A power supply control circuit comprising:
a low drop out circuit comprising an operational amplifier, the operational amplifier having an output configured to be coupled to a low drop out transistor;
a switcher circuit configured to provide a switcher operating voltage to the low drop out transistor; and
control signal circuitry configured to generate a low drop out enable signal and a bypass signal that turn off the low drop out circuit when an output voltage of the low drop out circuit is in the steady state condition.

17. The power supply control circuit as set forth in claim 16, wherein the control signal circuitry is also configured to generate the low drop out enable signal and the bypass signal that turn on the low drop out circuit when the output voltage of the low drop out circuit is not in the steady state condition.

18. A method for operating a power supply control circuit, the method comprising the steps of:
providing, at a switcher circuit coupled to a low drop out circuit, a switcher operating voltage to a low drop out transistor, the low drop out circuit comprising an operational amplifier having an output coupled to the low drop out transistor;
generating, at control signal circuitry, at least one control signal for the low drop out circuit and the switcher circuit; and
using the at least one control signal to turn off the low drop out circuit when an output voltage of the low drop out circuit is in a steady state condition;
wherein generating the at least one control signal comprises:
generating a bypass signal; and
generating a low drop out enable signal.

19. The method as set forth in claim 18, wherein:
generating the bypass signal comprises using an inverter; and
generating the low drop out enable signal comprises using a logical AND gate.

20. The method as set forth in claim 18, further comprising the step of:
using the at least one control signal to turn on the low drop out circuit when the output voltage of the low drop out circuit is not in the steady state condition.

21. The method of claim 18, wherein:
the low drop out enable signal controls whether the operational amplifier is enabled or disabled; and
the bypass signal controls whether a bypass transistor couples a gate of the low drop out transistor to ground.

* * * * *